(12) United States Patent  (10) Patent No.: US 7,476,873 B2
Hayashi  (45) Date of Patent: Jan. 13, 2009

(54) MICROSCOPE SYSTEM

(75) Inventor: Kazuhiro Hayashi, Akishima (JP)

(73) Assignee: Olympus Corporation, Tokyo (JP)

( * ) Notice: Subject to any disclaimer, the term of this patent is extended or adjusted under 35 U.S.C. 154(b) by 299 days.

(21) Appl. No.: 11/260,306

(22) Filed: Oct. 28, 2005

(65) Prior Publication Data

US 2006/0092504 A1   May 4, 2006

(51) Int. Cl.
G02B 21/00   (2006.01)
(52) U.S. Cl. ............... 250/458.1; 359/368; 359/432
(58) Field of Classification Search ........... 250/458.1; 359/368, 432
See application file for complete search history.

(56) References Cited

U.S. PATENT DOCUMENTS 5,157,552 A * 10/1992 Hagimori ............... 359/690
6,128,128 A * 10/2000 Otaki et al. ............. 359/381

FOREIGN PATENT DOCUMENTS

JP    06034888 A * 2/1994
JP    2004270010 A * 9/2004

\* cited by examiner

Primary Examiner—David P Porta
Assistant Examiner—David S Baker
(74) Attorney, Agent, or Firm—Kenyon & Kenyon LLP (57) ABSTRACT

A microscope system includes, at least, an objective lens for converting a luminous flux from an object into a parallel luminous flux, an afocal variable magnification optical system for changing a diameter of the parallel luminous flux emergent from the objective lens into a different diameter, and an image forming optical system for forming an image out of the parallel luminous flux emergent from the afocal variable magnification optical system, and the following conditions are satisfied:

$$2 \cdot NA(ob) \cdot FL(ob) \geq 30 \text{ (mm)}$$

$$6 \leq Lexz/X \leq 10$$

where, $NA(ob)$ is the maximum effective numerical aperture of the objective lens, $FL(ob)$ is a focal length of the objective lens, $X = 2 \cdot NA(ob) \cdot FL(ob)$, and $Lexz$ is a distance from an object surface to the most distant end of the afocal variable magnification optical system.

8 Claims, 10 Drawing Sheets

FIG.10A
SPHERICAL ABERRATION
FL=56
NAI 0.066

-1.00 — 1.00

FIG.10E
SPHERICAL ABERRATION
FL=177
NAI 0.064

-1.00 — 1.00

FIG.10I
SPHERICAL ABERRATION
FL=560
NAI 0.040

-3.00 — 3.00

FIG.10B
COMA
FL=56
FIY 8.80
1.033

-1.00 — 1.00

-1.033

FIG.10F
COMA
FL=177
FIY 8.80
1.017

-1.00 — 1.00

-1.017

FIG.10J
COMA
FL=560
FIY 8.80
1.100

-3.00 — 3.00

-1.100

FIG.10C
ASTIGMATISM
FL=56
FIY 11.00

-1.00 — 1.00

FIG.10G
ASTIGMATISM
FL=177
FIY 11.00

-1.00 — 1.00

FIG.10K
ASTIGMATISM
FL=560
FIY 11.00 ds
dm

-1.00 — 1.00

FIG.10D
CHROMATIC ABERRATION OF MAGNIFICATION
FL=56
FIY 11.00

-0.10 — 0.10

FIG.10H
CHROMATIC ABERRATION OF MAGNIFICATION
FL=177
FIY 11.00

-0.10 — 0.10

FIG.10L
CHROMATIC ABERRATION OF MAGNIFICATION
FL=560
FIY 11.00

-0.10 — 0.10 g ----- c ———
f —-— d ———

FIG.11A
SPHERICAL ABERRATION
FL=56
NAI 0.066

−1.00 ⎯⎯ 1.00

FIG.11E
SPHERICAL ABERRATION
FL=177
NAI 0.064

−1.00 ⎯⎯ 1.00

FIG.11I
SPHERICAL ABERRATION
FL=560
NAI 0.040

−3.00 ⎯⎯ 3.00

FIG.11B
COMA
FL=56
FIY 8.80
1.028

−1.00 ⎯⎯ 1.00
−1.028

FIG.11F
COMA
FL=177
FIY 8.80
1.018

−1.00 ⎯⎯ 1.00
−1.018

FIG.11J
COMA
FL=560
FIY 8.80
1.090

−3.00 ⎯⎯ 3.00
−1.090

FIG.11C
ASTIGMATISM
FL=56
FIY 11.00

−1.00 ⎯⎯ 1.00

FIG.11G
ASTIGMATISM
FL=177
FIY 11.00

−1.00 ⎯⎯ 1.00

FIG.11K
ASTIGMATISM
FL=560
FIY 11.00

−1.00 ⎯⎯ 1.00

FIG.11D
CHROMATIC ABERRATION OF MAGNIFICATION
FL=56
FIY 11.00

−0.10 ⎯⎯ 0.10

FIG.11H
CHROMATIC ABERRATION OF MAGNIFICATION
FL=177
FIY 11.00

−0.10 ⎯⎯ 0.10

FIG.11L
CHROMATIC ABERRATION OF MAGNIFICATION
FL=560
FIY 11.00

−0.10 ⎯⎯ 0.10 g ----- c ⎯⎯
f —-— d ⎯⎯

FIG.12A
SPHERICAL ABERRATION
FL=56
NAI 0.066

-1.00 — 1.00

FIG.12E
SPHERICAL ABERRATION
FL=177
NAI 0.064

-1.00 — 1.00

FIG.12I
SPHERICAL ABERRATION
FL=560
NAI 0.040

-3.00 — 3.00

FIG.12B
COMA
FL=56
FIY 8.80
1.185

-1.00 — 1.00
-1.185

FIG.12F
COMA
FL=177
FIY 8.80
1.038

-1.00 — 1.00
-1.038

FIG.12J
COMA
FL=560
FIY 8.80
1.068

-3.00 — 3.00
-1.068

FIG.12C
ASTIGMATISM
FL=56
FIY 11.00

-1.00 — 1.00

FIG.12G
ASTIGMATISM
FL=177
FIY 11.00

-1.00 — 1.00

FIG.12K
ASTIGMATISM
FL=560
FIY 11.00

-1.00 — 1.00

FIG.12D
CHROMATIC ABERRATION OF MAGNIFICATION
FL=56
FIY 11.00

-0.10 — 0.10

FIG.12H
CHROMATIC ABERRATION OF MAGNIFICATION
FL=177
FIY 11.00

-0.10 — 0.10

FIG.12L
CHROMATIC ABERRATION OF MAGNIFICATION
FL=560
FIY 11.00

MICROSCOPE SYSTEM

CROSS-REFERENCE TO RELATED APPLICATION

This application is related to Japanese Application No. 2004-270010 filed in Japan on Sep. 16, 2004, the content of which is incorporated by this reference.

BACKGROUND OF THE INVENTION

1. Field of the Invention

The present invention is related to a microscope system having excellent operation performance, bright image and variable magnification.

2. Description of the Related Art

Figure 1:
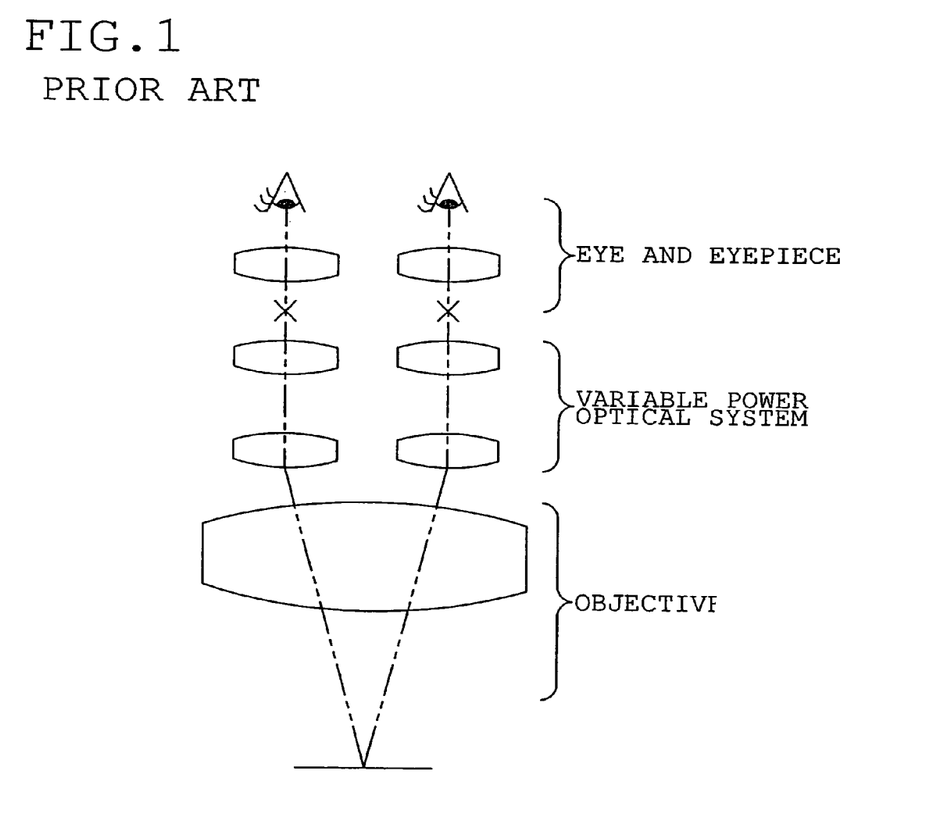
FIG. 1 is a diagram showing an outline composition of an optical system of conventional single objective lens type stereomicroscope.

Single objective lens type stereomicroscope is known as a conventional example of a microscope with excellent operation performance and extendibility. FIG. 1 is a view showing an outline composition of an optical system of such single objective lens type stereomicroscope. The objective lens of this kind of microscope has a focal length in a range of about 200 to 40 mm, and is that configured to assure comparatively low magnification for observation and a long working distance.

However, in the conventional single objective lens type stereomicroscope, due to restrictions of the distance between two right and left optical paths from an afocal variable magnification optical system to an image forming lens, etc., a diameter at the entrance of the afocal variable magnification optical system is limited to ½ or less of the effective diameter of the objective lens. Especially, in a design where a large magnification ratio is achieved by the afocal variable magnification optical system, brightness of the image tends to be insufficient on the higher magnification side because of the lens diameter of the afocal variable magnification optical system as a limiting factor.

This is the same in such case that imaging is carried out by leading luminous flux which has transmitted either of the right or the left afocal variable magnification optical system to an image sensor.

When a fluorescence image is observed by using an objective lens having a considerably large effective diameter compared with the afocal variable magnification optical system, in combination with an illumination system and filters for fluorescence observation, sufficient brightness cannot not be obtained although a large field of view for observation is secured. Especially in an optical system having a large observation range in this way, a careless omission of a weak and minute fluorescence marker etc. easily occur.

Then, in order to increase brightness of an image in a specific magnification and a specific focal length, it is necessary to enlarge the numerical aperture NA of a lens. Enlarging the numerical aperture NA of a lens is equivalent to enlarging a diameter of luminous flux emergent from an objective lens.

Here, the diameter (in millimeters) of luminous flux emergent from the objective lens is expressed as follows:

$$2 \cdot NA(ob) \cdot FL(ob) \quad (1)$$

where NA(ob) is a numerical aperture of an objective lens, and FL(ob) is a focal length (in millimeters) of the objective lens.

Generally a diameter of luminous flux emergent from the objective lens obtained from the condition (1) takes a value from about few mm to 20 mm in a microscope, and tends to be smaller as the focal length of the objective lens becomes shorter. Also in a stereomicroscope of a single objective-lens type, although the diameter of luminous flux emergent from the objective lens itself is about 40 mm or more, the effective diameter of the emergent luminous flux is about 20 mm, for it is limited by the effective diameter of an afocal variable magnification optical system.

SUMMARY OF THE INVENTION

A microscope system according to the present invention comprises, at least, an objective lens which changes luminous flux from an object into parallel luminous flux, an afocal variable magnification optical system which changes a diameter of luminous flux emanated from the objective lens into a different diameter of luminous flux, and an image forming optical system by which an image forming of the parallel luminous flux emanated from the afocal variable magnification optical system is carried out, and the following conditions are satisfied:

$$2 \cdot NA(ob) \cdot FL(ob) \geq 30 \text{ (mm)}$$

$$6 \leq Lexz/X \leq 10$$

where NA(ob) is the maximum effective numerical aperture of an objective lens, FL(ob) is a focal length (mm) of an objective lens, $X=2 \cdot (ob) \cdot FL(ob)$, and Lexz is a distance (mm) from an object surface to the most distant end of the afocal variable-magnification optical system.

The microscope system according to the present invention comprises, at least, an objective lens which changes luminous flux from an object into parallel luminous flux, an afocal variable magnification optical system which changes a diameter of luminous flux emanated from the objective lens into a different diameter of luminous flux, and an image forming optical system by which an image forming of the parallel luminous flux emanated from the afocal variable magnification optical system is carried out, wherein the objective lens, the afocal variable magnification optical system and the image forming optical system can be arranged keeping an interval more than $L=F(TL)/2$ and the following condition is satisfied:

$$D(TL) > EXP(max) * 1.25$$

where L is a distance (mm) from an exit end of a zoom lens to an entrance end of the image forming lens, F (TL) is a focal length (mm) of the image forming lens, D(TL) is an effective diameter (mm) of the image forming lens, and EXP(max) is a diameter (mm) of the largest exit pupil of the afocal variable magnification optical system.

The microscope system of the present invention comprises at least, two and more objective lenses which change luminous flux from an object into parallel luminous flux, an afocal variable magnification optical system which changes a diameter of luminous flux emanated from the objective lens into a different diameter of luminous flux, and an image forming optical system by which an image forming of the parallel luminous flux emanated from the afocal variable magnification optical system is carried out, and the two or more objective lenses mentioned above satisfies the following conditions:

$$2 \cdot NA(ob) \cdot FL(ob) \geq 30 \text{ (mm)}$$

$$X(Max)/X(Min) < 1.25$$

$$M(obH)/M(obL) > 2$$

$$L(obMax)/L(obMin) < 1.1$$

where NA(ob) is the maximum effective numerical aperture of each objective lens, FL(ob) is a focal length (mm) of each objective lens, X(Max) is the maximum value (mm) of $2 \cdot NA(ob) \cdot FL(ob)$, X(Min) is the minimum value (mm) of $2 \cdot NA$ (ob)·FL (ob), M(obH) is the magnification of an objective lens with the highest magnification, M(obL) is the magnification of an objective lens with the lowest magnification, L(ob Max) is the maximum value of a distance (mm) from an object surface to the utmost surface of the objective lens, and L(ob Min) is the minimum value of the distance (mm) from an object surface to the utmost surface of the objective lens.

The microscope system of the present invention comprises at least, an objective lens which changes luminous flux from an object into parallel luminous flux, a first afocal variable magnification optical system which changes a diameter of luminous flux emanated from the objective lens into a different diameter of luminous flux, and an image forming optical system by which image forming of the parallel luminous flux emanated from the first afocal variable magnification optical system is carried out, and a second afocal variable magnification optical system(ca) which can be inserted between the objective lens and the first afocal variable magnification optical system, and the following conditions are satisfied:

$$M(ca) \geq 0.8$$

$$ENP(\max) \geq EXP(ob)/M(ca)$$

where M(ca) is a magnification of the second afocal variable magnification optical system, ENP(max) is a diameter (mm) of the largest exit pupil of the first afocal variable magnification optical system, and EXP(ob) is a diameter (mm) of the exit pupil of the objective lens.

Furthermore, according to the present invention, in a microscope system in which illuminating light having a selected wavelength is projected on a sample, to achieve observation of light (fluorescence etc.) emitted from the sample, which has a wavelength different from the illuminating light, a filter for separating the wavelength of the illuminating light and the wavelength of the light for observation is arranged within a range satisfying the following condition:

$$L(f)=F(TL)/3$$

where L(f) is a distance (mm) from the exit end of the afocal variable magnification optical system to the filter, and F(TL) is a focal length (mm) of the image forming lens.

According to the microscope of the present invention, an effective NA can be obtained by fully utilizing the diameter of the objective lens.

According to the microscope of the present invention, as the focal length of an objective lens is within a range of about 200 mm to 40 mm, a working distance about 180 mm to 20 mm can be obtained. Since a working distance of 50 mm or greater allows a observer to easily access a sample while observing the sample under a microscope, the microscope of the present invention assures an observer an easy access to a sample under microscopic observation.

Moreover, at a working distance about 20 mm, retraction of the objective lens is not necessary in each time when a sample in a container, such as a culture dish, is to be observed or when a sample is exchanged. In this way, the microscope according to the present invention demonstrates an excellent operation performance as a microscope for operation.

Furthermore, according to the microscope of the present invention in which a distance from the object surface to the last surface of the afocal variable-magnification optical system is limited while a large effective numerical aperture of the objective lens is assured, a suitable optical path length to allow an operator to make observation in an easy posture is obtained.

Moreover, in view of various operations of an observation sample such as selecting and dissecting, it is desirable that an optimal magnification suitable for each use can be selected easily and quickly in order to carry out observation and photographing of a specific part under one microscope.

Furthermore, it is desirable that the magnification is continuously selectable. Therefore, the microscope of the present invention has a zoom type variable magnification lens by which a magnification can be chosen arbitrarily over a wide range by a single action. Further, the configuration can be made to provide two or more magnifications by inserting two or more afocal variable magnification optical systems selectively, even though it may be inferior in convenience to some extent.

According to the microscope of the present invention, it is possible to apply for further various uses by selecting suitable objective lenses in accordance with individual uses such as observing a larger field of view, obtaining a higher resolution, etc. In this case, each of the objective lenses has a substantially equal distance from an object surface to an exit end of the objective lens, and a focal position does not shift largely with exchange of the objective lenses. Therefore, operation performance can be remarkably improved.

According to the microscope of the present invention since it has a large NA (numerical aperture), while securing a long working distance and a large observation field of view, a bright fluorescence image can be obtained, especially when selection of an ecology sample is carried out by using as a marker protein (GFP etc.) which emits fluorescence, and when observing a sample for which marking of an internal organ of small animals, such as a rat, etc has been carried out. Thus, a careless overlooking of a marker can be prevented. Furthermore, since a sufficient bright fluorescence image is obtained, an increase in efficiency of operation can be attained, without making surroundings of a sample and a whole room dark when fluorescence observation is carried out.

These and other features and advantages of the present invention will become apparent from the following detailed description of the preferred embodiments when taken in conjunction with the accompanying drawings.

BRIEF DESCRIPTION OF THE DRAWINGS

FIG. 5 is a sectional view taken along the optical axis, of an optical system constructed of the afocal zoom lens shown in FIGS. 3A-3C and the image forming lens shown in FIG. 4 at a suitable interval between.

FIGS. 8A, 8E, and 8I show spherical aberration, FIGS. 8B, 8F, and 8J show coma, FIGS. 8C, 8G, and 8K show astigmatism, and FIGS. 8D, 8H, and 8L show chromatic aberration of magnification.

FIGS. 9A, 9E, and 9I show spherical aberration, FIGS. 9B, 9F, and 9J show coma, FIGS. 9C, 9G, and 9K show astigmatism, and FIGS. 9D, 9H, and 9L show chromatic aberration of magnification.

FIGS. 10A, 10E, and 10I show spherical aberration, FIGS. 10B, 10F, and 10J show coma, FIGS. 10C, 10G, and 10K show astigmatism, and FIGS. 10D, 10H, and 10L show chromatic aberration of magnification.

FIGS. 11A, 11E, and 11I show spherical aberration, FIGS. 11B, 11F, and 11J show coma, FIGS. 11C, 11G, and 11K show astigmatism, and FIGS. 11D, 11H, and 11L show chromatic aberration of magnification.

FIGS. 12A, 12E, and 12I show spherical aberration, FIGS. 12B, 12F, and 12J show coma, FIGS. 12C, 12G, and 12K show astigmatism, and FIGS. 12D, 12H, and 12L show chromatic aberration of magnification.

DETAILED DESCRIPTION OF THE PREFERRED EMBODIMENTS

Prior to explanation of embodiments of the present invention, function and action of the present invention will be explained.

In a microscope of the present invention, in order to increase the brightness of an observation image, it is designed so that the following condition may be satisfied:

$$2 \cdot NA(ob) \cdot FL(ob) > 30 \text{ (mm)} \qquad (2)$$

where, NA(ob) is the maximum effective numerical aperture of an objective lens, and FL(ob) is the focal length (mm) of the objective lens.

The condition(2) means that an image becomes brighter twice or more, when it is compared with an objective lens having the value which is about 20 mm in the same magnification. It is because image brightness has a relation proportional to square of the diameter of exit luminous flux.

In order to obtain a brighter image, a value of the condition (2) should be larger than 30. In order to get much a larger value than 30 in the condition (2), it is necessary to enlarge a diameter of the lens itself considerably. However, due to problems such as productivity and cost performance, the suitable diameter of the lens is up to around 50.

In another viewpoint, in case that a suitable magnification range (for example, about 10 times) is kept, there is a tendency that a full length of an afocal variable magnification optical system becomes longer as the diameter of luminous flux emergent from the objective lens becomes larger, by reasons for aberration correction etc.

Also, in order to prevent too lengthy entire length of the system to allow an operator to maintain a suitable observation posture without particularly bending the optical path etc, the diameter of the luminous flux emergent from the objective lens is suitable to be up to around 50 mm.

Furthermore, the distance from an object surface to the most distant end of an afocal variable magnification optical system falls within a range of 180 mm to 500 mm by satisfying the following condition:

$$6 \leq Lexz/X \leq 10 \qquad (3)$$

where X is 2NA(ob)·FL(ob), NA(ob) is the maximum effective numerical aperture of the objective lens, FL(ob) is a focal length (mm) of the objective lens, and Lexz is a distance (mm) from an object surface to the most distant end of the afocal variable magnification optical system.

By arranging a suitable image forming lens or a body tube or the like having such an image forming lens on an afocal variable magnification optical system satisfying conditions (2) and (3), it becomes possible to offer a microscope by which observation can be carried out in an easy posture of an operator.

Furthermore, in a microscope comprising an objective lens, an afocal variable magnification optical system which changes a diameter of luminous flux emanated from the objective lens into a different diameter of luminous flux, and an image forming optical system by which an image forming of the parallel luminous flux emanated from the afocal variable magnification optical system is carried out, expansion of the system is possible.

Concretely, by inserting a half mirror or a filter for introducing luminous flux for a fluorescence observation into parallel luminous flux, or by inserting a half mirror or the like for branching all or a part of the luminous flux toward a side direction, this system can be applied to various observation methods and applications.

In order to give such expansion possibility, it is desirable that an optical component can be arranged so as to have an interval more than a value obtained by the following condition:

$$L = F(TL)/2 \qquad (4)$$

where L is a distance (mm) from an exit end of a zoom lens to an entrance end of the image forming lens, F (TL) is a focal length (mm) of the image forming lens.

Furthermore, for securing a sufficient amount of light at a peripheral portion of an observation field of view, and for preventing from generation of conspicuous unevenness etc. in the field of view, it is desirable to satisfy the following condition.

$$D(TL) \geqq EXP(max)*1.25 \qquad (5)$$

where D(TL) is an effective diameter of an image forming lens:

In a fluorescence observation, a half mirror used for projecting illuminating light with a selected wavelength to a sample and for allowing observation with a different wavelength from the illuminating light and a filter for separating wavelength are inserted into an interval having a value obtained by the condition (3) mentioned above. A mirror unit is configured to include such filters and half mirrors, and two or more such mirror units are prepared so that the fluorescence image of two or more wavelengths can be chosen easily.

In order to constitute two or more of these mirror units with necessary minimum size and to achieve to make them at low cost, it is desirable to satisfy the following condition:

$$L(f) = F(TL)/3 \qquad (6)$$

where L(f) is a distance (mm) from an exit end of a zoom lens to a filter, and F(TL) is a focal length (mm) of the image forming lens.

In a microscope system comprising an objective lens, an afocal variable magnification optical system which changes a diameter of luminous flux emanated from the objective lens into a different diameter of luminous flux, and an image forming optical system by which an image forming of the parallel luminous flux emanated from the afocal variable magnification optical system is carried out, it is possible to choose a different objective lens and the like, when carrying out an observation in much wider range of magnification than such range that is variable by the afocal variable magnification optical system in the magnification range and when a longer working distance and a larger numerical aperture are needed.

The objective lens used for the microscope of the present invention can have outstanding operation performance and system extendibility without shifting a focus position largely, when they are exchanged, also in an objective lens corresponding to various uses by satisfying the following conditions:

$$2 \cdot NA(ob) \cdot FL(ob) \geqq 30 \text{ (mm)} \qquad (2)$$

$$>1.25 \qquad (7)$$

$$M(obH)/M(obL) \geqq 2 \qquad (8)$$

$$L(obMax)/L(obMin) < 1.1 \qquad (9)$$

where NA(ob) is the maximum effective numerical aperture of each objective lens, FL(ob) is a focal length (mm) of each objective lens, X(Max) is the maximum of $2 \cdot NA(ob) \cdot FL(ob)$, X(Min) is the minimum value of $2 \cdot NA(ob) \cdot FL(ob)$, M(obH) is the magnification of an objective lens with the highest magnification, M(obL) is the magnification of an objective lens with the lowest magnification, L (ob Max) is the maximum of a distance (mm) from an object surface to the utmost surface of the objective lens, and L(ob Min) is the minimum value of the distance (mm) from an object surface to the utmost surface of the objective lens.

In the condition (8), when a magnification range satisfying $M(obH)/M(obL) \geqq 2\times$ is given, it becomes possible to choose an objective lens having a suitable magnification or a suitable numerical aperture according to various uses. For example, that is an objective lens having a long working distance or an objective lens having a large numerical aperture and high resolving power, etc.

In order to utilize sufficiently each objective lens and effective diameter of an afocal variable magnification optical system, respectively without futility, it is desirable for a diameter of exit luminous flux of each of objective lenses to have nearly same size. If the condition (7) is not satisfied, a state where each of effective diameters is not fully utilized efficiently in either of an objective lens or an afocal variable magnification optical system will occur.

Generally, a high-resolution objective lens, which has a larger numerical aperture NA on the object side, has small values of the working distance, the focal length, and the full length, respectively, and has an exit pupil diameter from several mm to about 20 mm.

If such an objective lens with a small exit pupil diameter and a variable magnification optical system with a large entrance pupil diameter are combined, there is a problem that the large diameter of a lens of the variable magnification optical system becomes not only ineffectual, but also it is easy to cause excessive magnification for NA on the object side, and accordingly only a little faded image is obtained.

So, in order to obtain a suitable observation magnification according to the numerical aperture on the object side, it is necessary to arrange a second variable magnification optical system that the diameter of a pupil becomes appropriate between an objective lens and a variable magnification optical system.

If the objective lens is designed as an infinite distance type, such a second variable magnification optical system should be an afocal variable magnification optical system. As for the magnification, it is desirable to satisfy the following conditions:

$$M(ca) \leqq 0.8 \qquad (10)$$

$$ENP(max) \geqq EXP(ob)/M(ca) \qquad (11)$$

where M(ca) is a magnification of the second afocal variable magnification optical system, ENP(max) is a diameter (mm) of the maximum exit pupil of the first a focal variable magnification optical system, and EXP(ob) is a diameter (mm) of the exit pupil of the objective lens.

In order to make a difference between the diameter of the exit pupil of the objective lens and the diameter of the incidence pupil of the first variable magnification optical system small by expanding the diameter of the exit pupil of the objective lens, the magnification of the second variable magnification optical system M(ca) must have a value smaller than 1.

This is because a pupil diameter and magnification have a relation of an inverse proportion in an afocal variable magnification optical system.

As a condition to acquire the maximum effect of expanding the exit pupil of the objective lens, M(ca) should be 0.8 or less. When it is greater than 0.8, sufficient effect cannot be obtained.

As another condition to obtain the maximum effect of expanding the exit pupil of the objective lens, in addition to satisfaction of the above condition of M(ca), it is desirable to satisfy the following condition:

$$ENP(\max) \geqq EXP(ob)/M(ca)$$

If this condition is exceeded, a loss of the luminous flux is generated, and a problem such that the effective numerical aperture NA on the object side becomes smaller arises.

Hereafter, embodiments of the present invention will be explained using drawings.

First Embodiment

Figure 2:
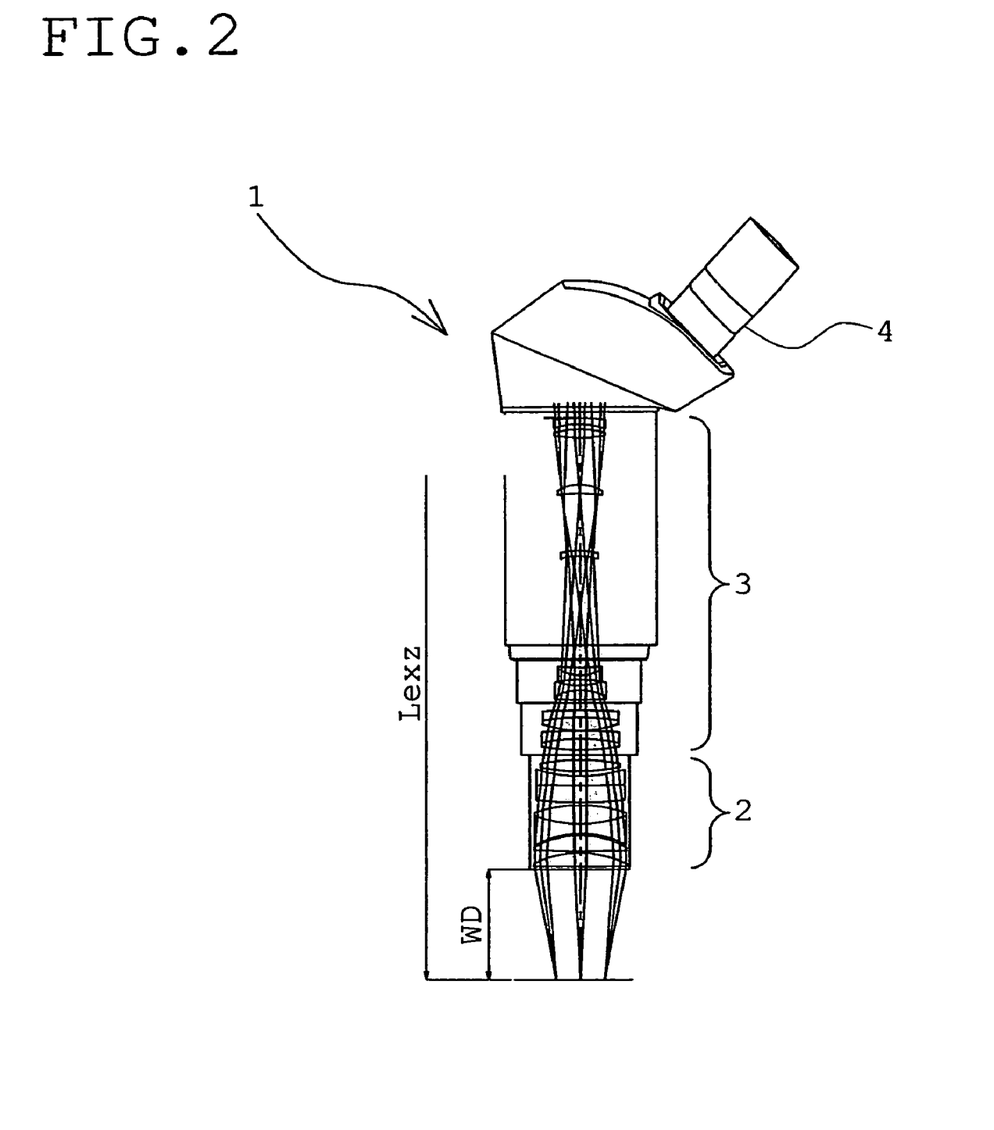
FIG. 2 is a diagram showing an optical composition of the microscope system of the first embodiment according to the present invention.

FIG. 2 is a diagram explaining an optical composition of the microscope system of the first embodiment according to the present invention.

As shown in FIG. 2, a microscope system 1 of the first embodiment is equipped with an objective lens 2 and an afocal variable magnification optical system 3, and a sample can be observed through an eyepiece 4.

As shown in FIG. 2, the microscope system of the first embodiment is constituted such that it has a long working distance WD, and a distance to the exit end of a zoom lens is suppressed moderately. In FIG. 2, Lexz is a distance from an object surface to the most distant end of the afocal variable magnification optical system. In FIG. 2, a light path diagram shows a state when the magnification of the afocal variable magnification optical system is the minimum.

In the first embodiment, the value of the condition (2) is 45, and the value of the condition (3) is 7.5. However, when values of the conditions (2) and (3) are smaller than this, for example, when the value of the condition (2) is 30 and the value of the condition (3) is 6, since the eye point position at the time of observing through a microscope becomes low, it is necessary to combine a holding body so as to keep the eye point at a high position.

When the values of the conditions (2) and (3) are larger than the values of the conditions in the first embodiment, for example, when such values are 50 and 10, conversely, it is necessary to combine the holding body so as to keep the eye point position lower.

Thus, it becomes possible to offer a microscope that allows an operator to keep a suitable observation posture, by using the values of the conditions (2) and (3).

Second Embodiment

Figure 3A:
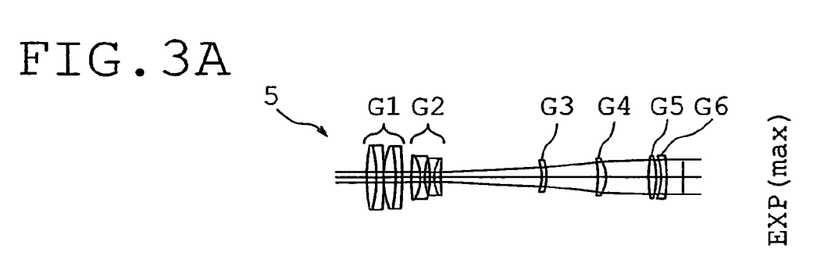
FIGS. 3A, 3B, and 3C are sectional views taken along the optical axis, showing an example of an afocal zoom lens used for the microscope system of the present invention, and showing a minimum magnification state, a middle magnification state, and a maximum magnification state, respectively.
Figure 3B:
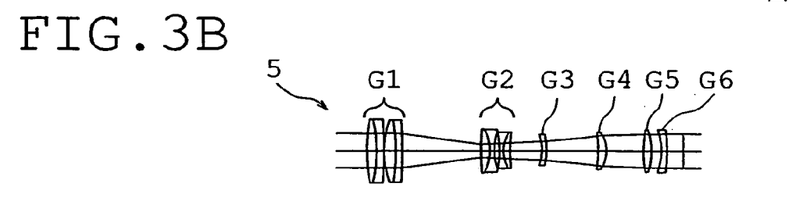
Figure 3C:
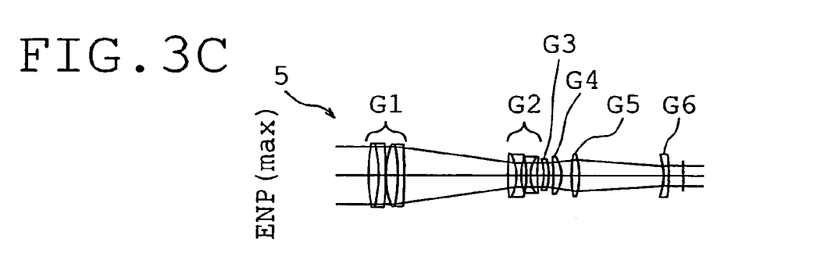

FIGS. 3A-3C are sectional views taken along the optical axis, showing an example of an afocal zoom lens used for the microscope system of the present invention.

FIG. 3A shows a minimum magnification state of the afocal zoom lens.

FIG. 3B shows a middle magnification state.

FIG. 3C shows a maximum magnification state.

As shown in FIGS. 3A-3C, the a focal zoom lens 5 has a plurality of lens groups G1, G2, G3, G4, G5, and G6, wherein magnification can be changed by changing a distance from an object surface to each of these lens groups G1 to G6.

FIGS. 3A-3C show that the diameter of an exit pupil becomes the maximum when the magnification is the minimum, and the diameter of then exit pupil becomes the minimum when the magnification is the maximum.

The second embodiment shows a case where ENP (max) =45 and the full length is 190. When ENP(max) is reduced until it becomes 30, the full length becomes 127. The afocal zoom lens 5 can be combined with, for example, an image forming lens.

Figure 4:
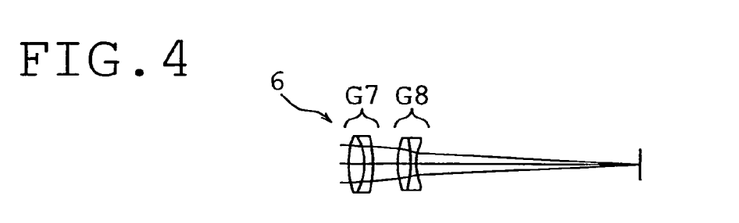
FIG. 4 is a sectional view taken along the optical axis, of an image forming lens combinable with the afocal zoom lens shown in FIGS. 3A-3C.

FIG. 4 is a sectional view taken along the optical axis of an image forming lens combinable with the afocal zoom lens 5. The image forming lens 6 shown in FIG. 4 has a plurality of lens groups G7 and G8. A light path diagram shown in FIG. 4, shows a range of luminous flux transmitted to the center of field of view when the diameter of an exit pupil of the afocal zoom lens becomes the maximum, wherein an effective diameter of the image forming lens is greater than EXP(max) *1.25.

A desired focal length can be obtained by combining it with the afocal zoom lens 5 shown in FIGS. 3A-3C.

The focal length of the image forming lens shown in FIG. 4 is 180 mm, and the effective diameter of the image forming lens is ϕ36.

Figure 5:
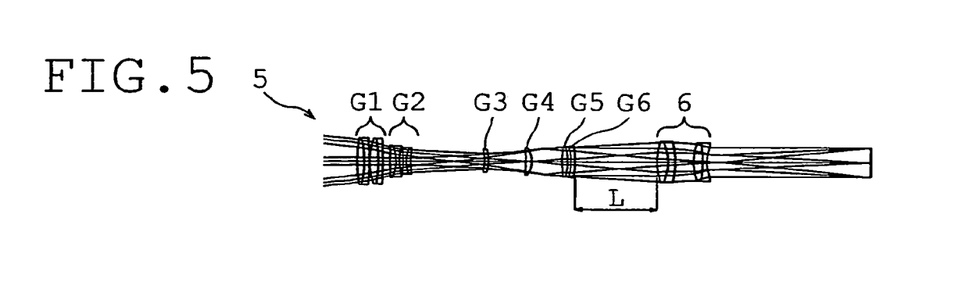

FIG. 5 is a sectional view taken along the optical axis, of an optical system constructed of the afocal zoom lens 5 shown in FIGS. 3A-3C, and the image forming lens 6 shown in FIG. 4, which are arranged at a suitable interval between.

As shown in FIG. 5, since the effective diameter of the image forming lens is greater than EXP(max)*1.25 in reference to the diameter of the maximum exit pupil of the afocal zoom lens, even when the distance L from an exit end of a zoom lens to an entrance end of the image forming lens is large, sufficient luminous flux is secured over the peripheral portion of the image.

The distance L (mm) from the exit end of the zoom lens to the entrance end of an image forming lens, and focal length F (TL) of the image forming lens in the second embodiment are shown below:

$$L=100(=F(TL)/1.8) \text{ (mm)}$$

$$F(TL)=180 \text{ (mm)}$$

Third Embodiment

In FIGS. 6A to 6D, examples of an objective lens combined with the microscope system according to the present invention are shown. A light path diagram shown in each of FIGS. 6A-6D shows a state where the magnification of an afocal variable magnification optical system is the minimum, and an observation range becomes the maximum. An objective lens 7a shown in FIG. 6A has a lens group G9 having negative power, a focal length of which is longer than the full length of a lens, and a lens group G10 having positive power. Objective lenses 7b to 7d have focal lengths which are shorter than the full lengths of the respective objective lenses, and include, respectively, lens groups G11, G14 and G17 each having positive power, lens groups G12, G15 and G18 each having weak power, and lens groups G13 G16, and G19 each composed of a meniscus lens with a convex surface being directed to the object side and a positive single lens.

As shown in FIGS. 6A to 6D, in any of objective lenses, the full length is set to be nearly same as around 140 mm, and is set to have a lens diameter involves nearly the same exit pupil diameter. Concretely, each of the objective lenses has a focal length of 180 to 56 mm, and M(obH)/M(obL)=3.2. Any of the objective lenses are designed as follows:

$$2 \cdot NA(ob)FL(ob)=40 \sim 45 \text{(around 40 to 45) (mm)}$$

$$L(ob\text{Max})/L(ob\text{Min})=1.04.$$

Fourth Embodiment

Figure 7:
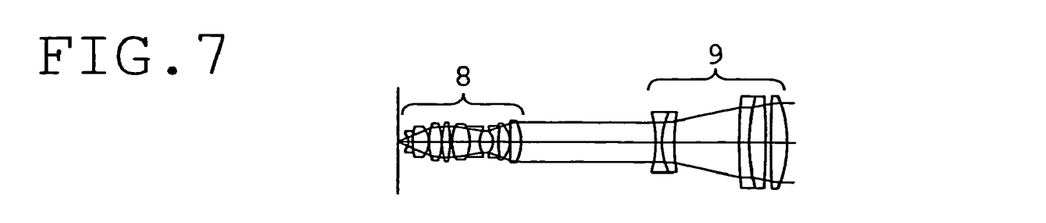
FIG. 7 is a sectional view taken along the optical axis, of an optical system according to the present invention, constructed of an objective lens and a second afocal magnification lens.
Figure 8A:
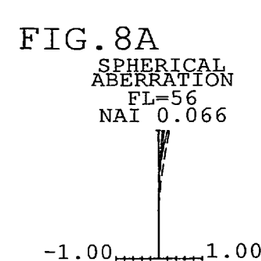
FIGS. 8A to 8D, 8E to 8H, and 8I to 8L are aberration diagrams showing aberrations (i.e. spherical aberration, coma, astigmatism, and chromatic aberration of magnification) in the cases where the afocal zoom lens shown in FIGS. 3A-3C and the image forming lens shown in FIG. 4 are arranged at suitable intervals between, to have composite focal lengths of 56 mm, 177 mm, and 560 mm, respectively. To be specific.
Figure 8B:
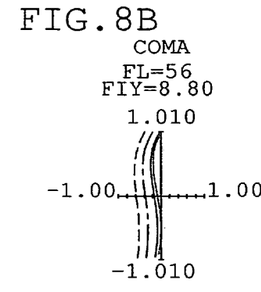
Figure 8C:
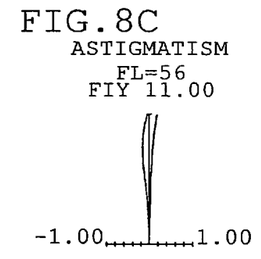
Figure 8D:
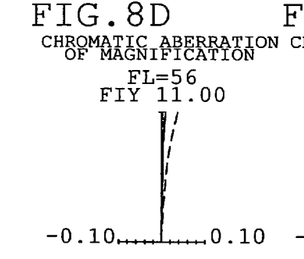
Figure 8E:
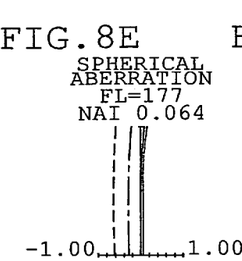
Figure 8F:
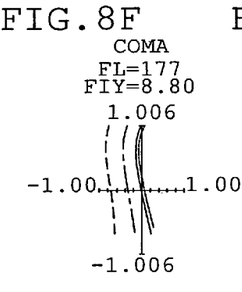
Figure 8G:
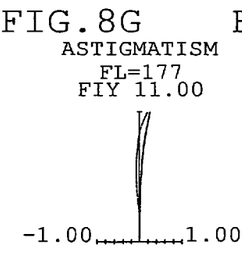
Figures 8H, 8L:
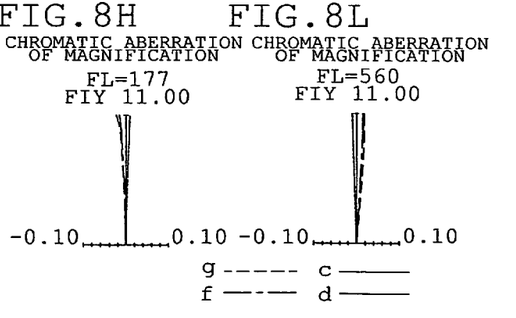
Figure 8I:
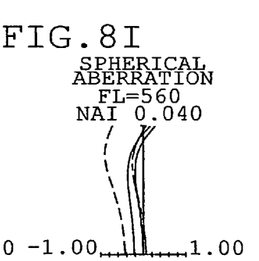
Figure 8J:
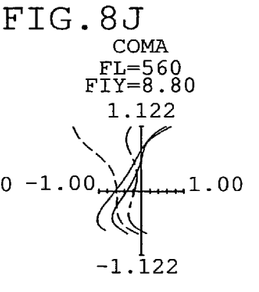
Figure 8K:
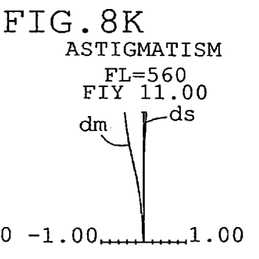
Figure 9A:
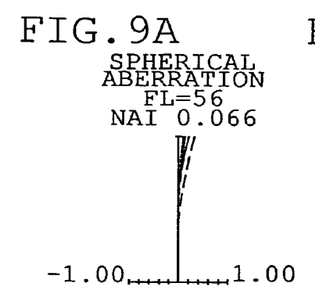
FIGS. 9A to 9D, 9E to 9H, and 9I to 9L are aberration diagrams showing aberrations (i.e. spherical aberration, coma, astigmatism, and chromatic aberration of magnification) in the cases where the objective lens shown in FIG. 6A, the afocal zoom lens shown in FIGS. 3A-3C, and the image forming lens shown in FIG. 4 are arranged at suitable intervals between, so that composite focal lengths of the afocal zoom lens and the image forming lens are 56 mm, 177 mm, and 560 mm, respectively. To be specific.
Figure 9B:
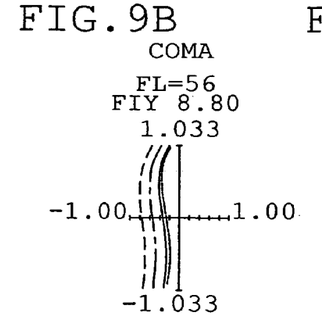
Figure 9C:
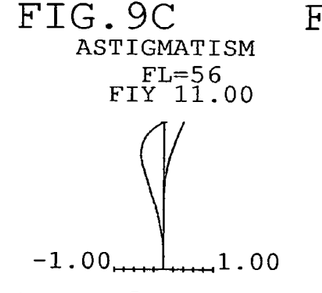
Figure 9D:
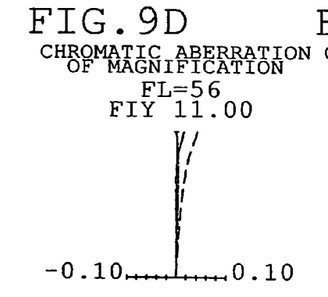
Figure 9E:
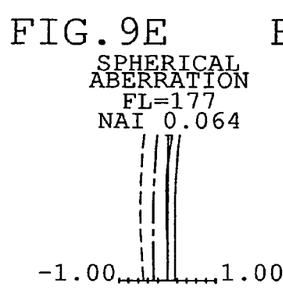
Figure 9F:
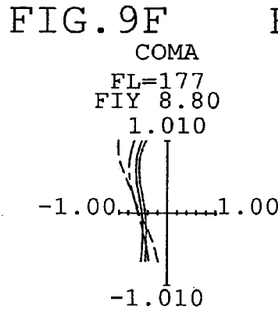
Figure 9G:
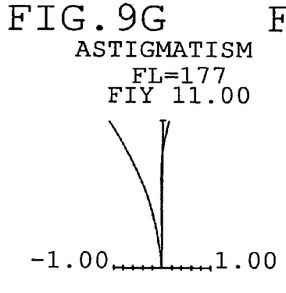
Figures 9H, 9L:
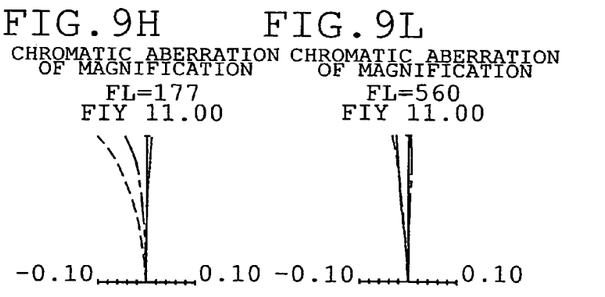
Figure 9I:
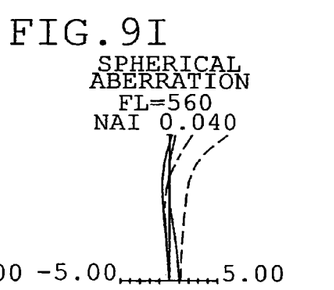
Figure 9J:
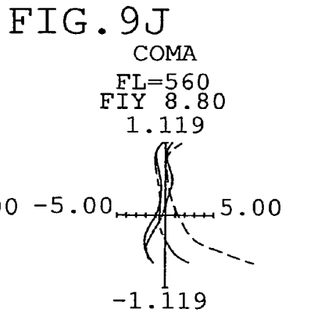
Figure 9K:
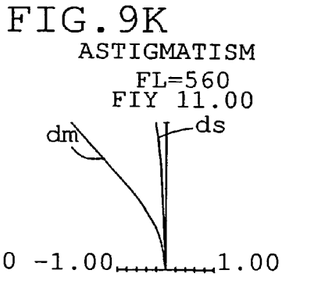
Figure 10A:
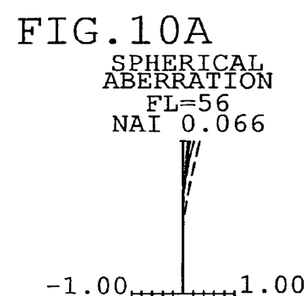
FIGS. 10A to 10D, 10E to 10H, and 10I to 10L are aberration diagrams showing aberrations (i.e. spherical aberration, coma, astigmatism, and chromatic aberration of magnification) in the cases where the objective lens shown in FIG. 6B, the afocal zoom lens shown in FIGS. 3A-3C, and an image forming lens shown in FIG. 4 are arranged at suitable intervals between, so that composite focal lengths of the afocal zoom lens and the image forming lens are 56 mm, 177 mm, and 560 mm, respectively. To be specific.
Figure 10B:
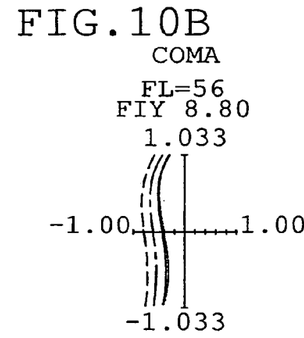
Figure 10C:
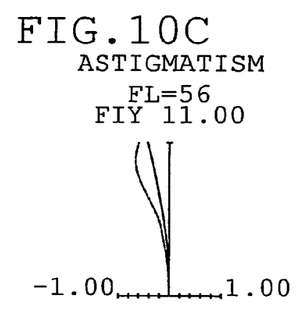
Figure 10D:
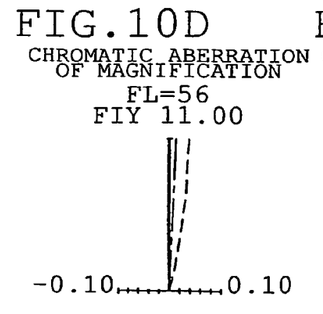
Figure 10E:
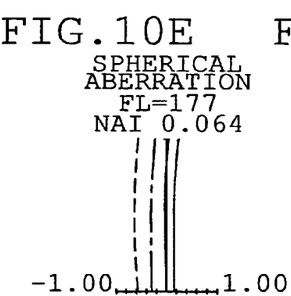
Figure 10F:
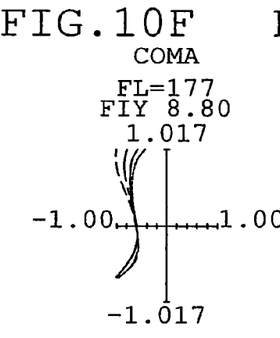
Figure 10G:
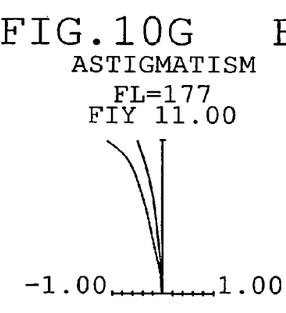
Figure 10H:
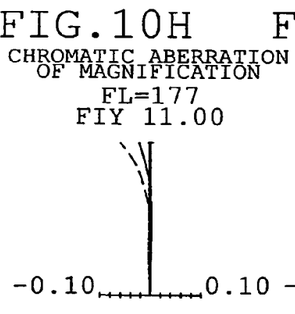
Figure 10I:
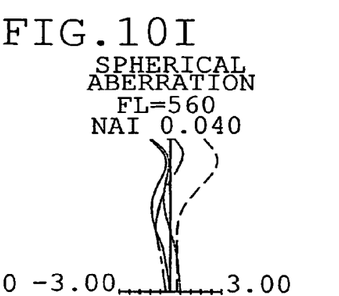
Figure 10J:
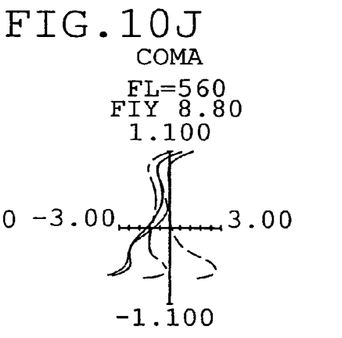
Figure 10K:
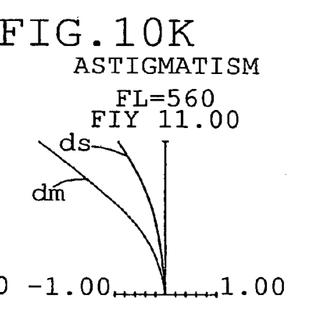
Figure 10L:
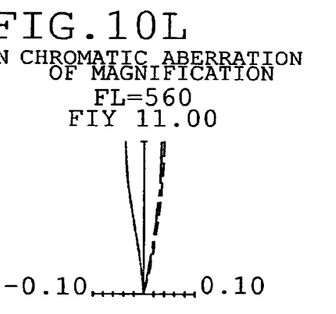
Figure 11A:
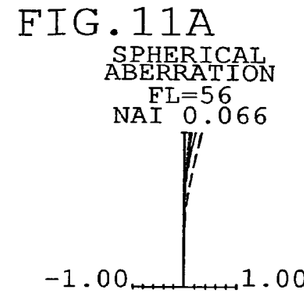
FIGS. 11A to 11D, 11E to 11H, and 11I to 11L are aberration diagrams showing aberrations (i.e. spherical aberration, coma, astigmatism, and chromatic aberration of magnification) in the cases where the objective lens shown in FIG. 6C, the afocal zoom lens shown in FIGS. 3A-3C, and the image forming lens shown in FIG. 4 are arranged at suitable intervals between, so that composite focal lengths of the afocal zoom lens and the image forming lens are 56 mm, 177 mm, and 560 mm, respectively. To be specific.
Figure 11B:
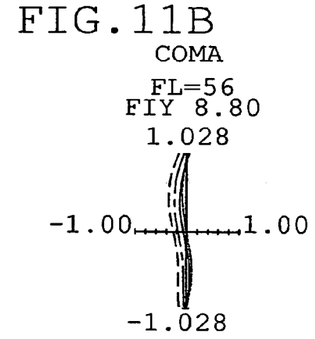
Figure 11C:
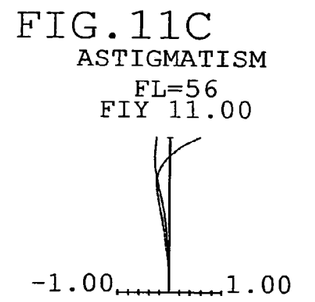
Figure 11D:
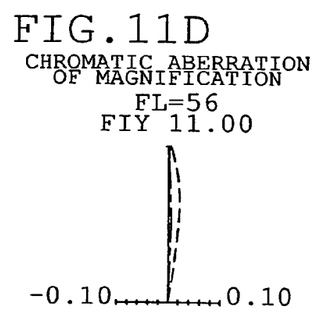
Figure 11E:
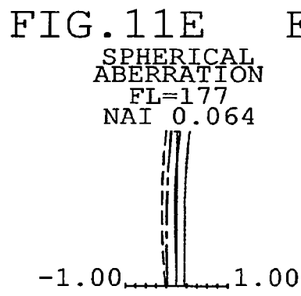
Figures 11F, 11J:
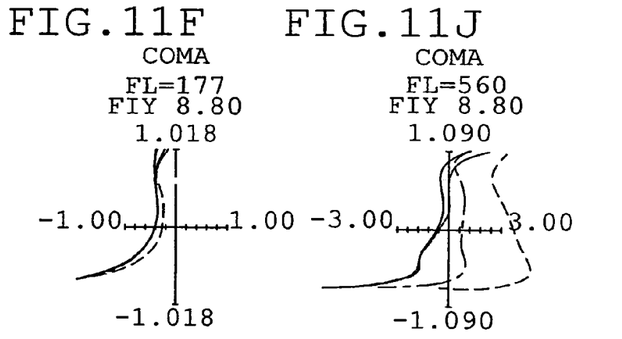
Figures 11G, 11K:
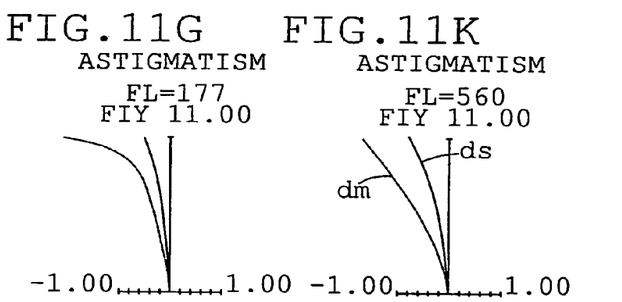
Figure 11H:
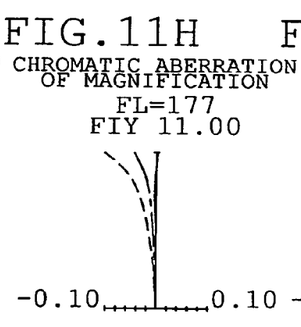
Figure 11I:
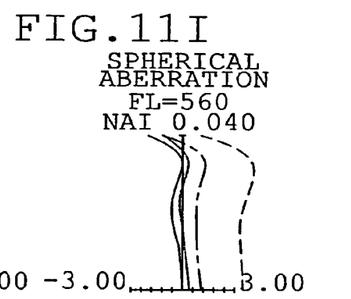
Figure 11L:
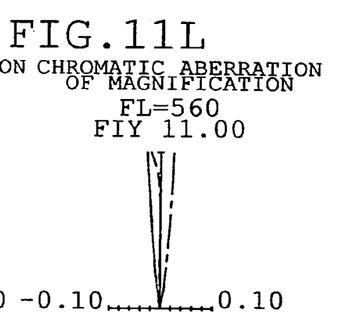
Figure 12A:
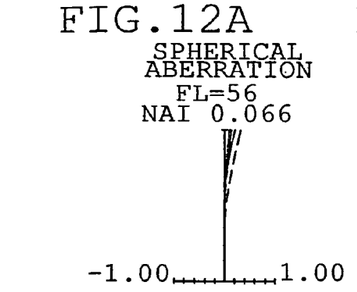
FIGS. 12A to 12D, 12E to 12H, and 12I to 12L are aberration diagrams showing aberrations (i.e. spherical aberration, coma, astigmatism, and chromatic aberration of magnification) in the cases where the objective lens shown in FIG. 6D, the afocal zoom lens shown in FIGS. 3A-3C, and the image forming lens shown in FIG. 4 are arranged at suitable intervals between, so that composite focal lengths of the afocal zoom lens and the image forming lens are 56 mm, 177 mm, and 560 mm, respectively. To be specific.
Figure 12B:
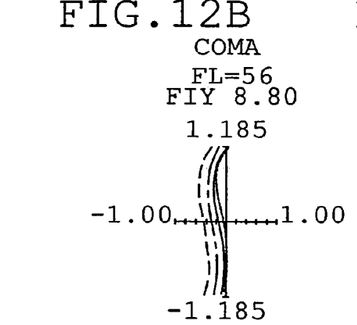
Figure 12C:
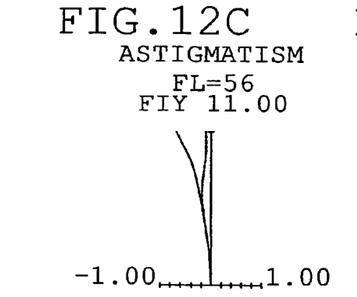
Figure 12D:
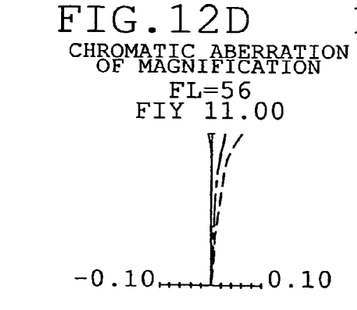
Figure 12E:
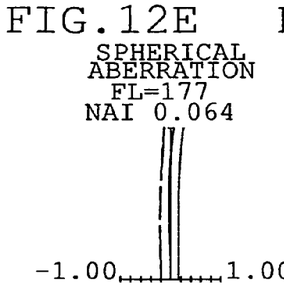
Figure 12F:
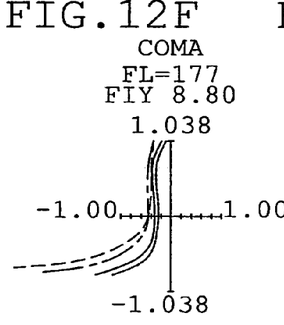
Figure 12G:
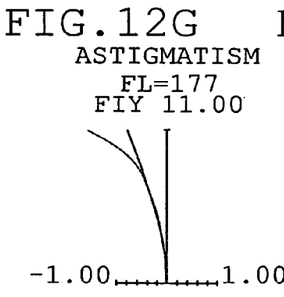
Figure 12H:
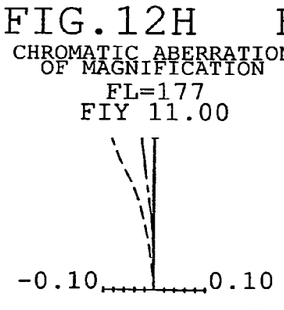
Figure 12I:
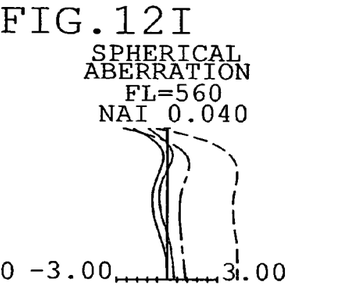
Figure 12J:
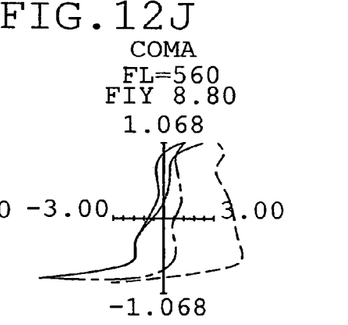
Figure 12K:
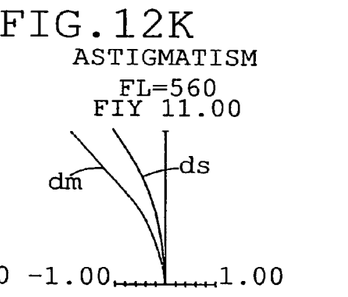
Figure 12L:
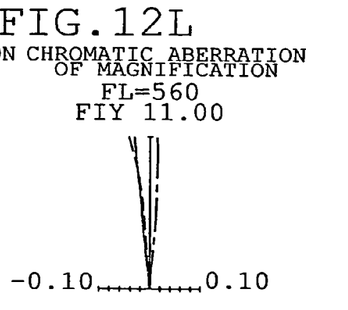
Figure 13A:
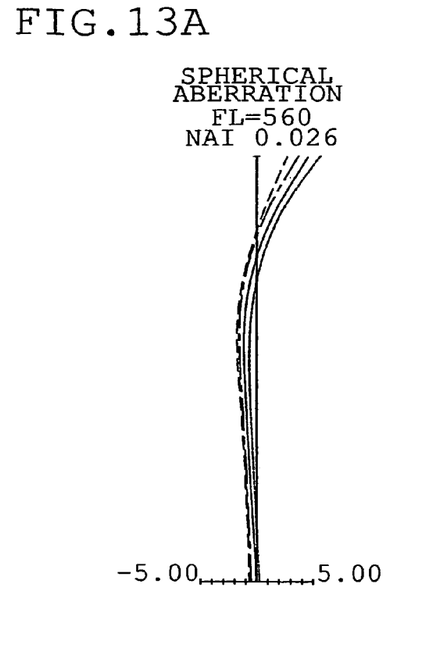
FIGS. 13A-13D are aberration diagrams showing spherical aberration, coma, astigmatism, and chromatic aberration of magnification, respectively, in the case where the objective lens and the second afocal magnification lens shown in FIG. 7, the afocal zoom lens shown in FIGS. 3A-3C and the image forming lens shown in FIG. 4 are arranged at suitable intervals between, so that a composite focal length of the afocal zoom lens and the image forming lens is 560 mm.
Figure 13B:
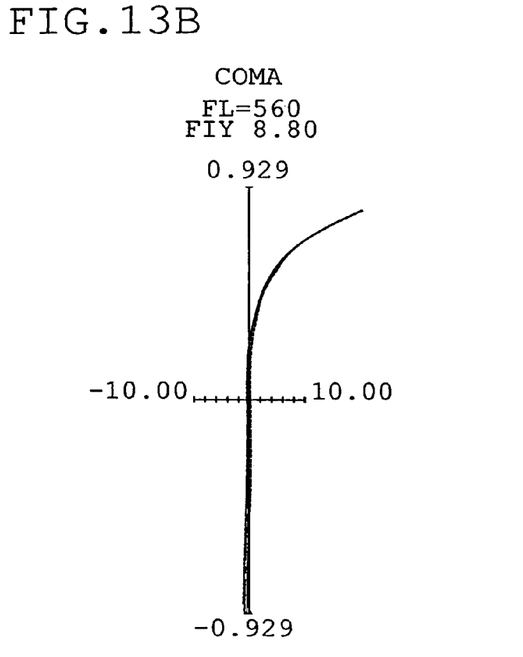
Figure 13C:
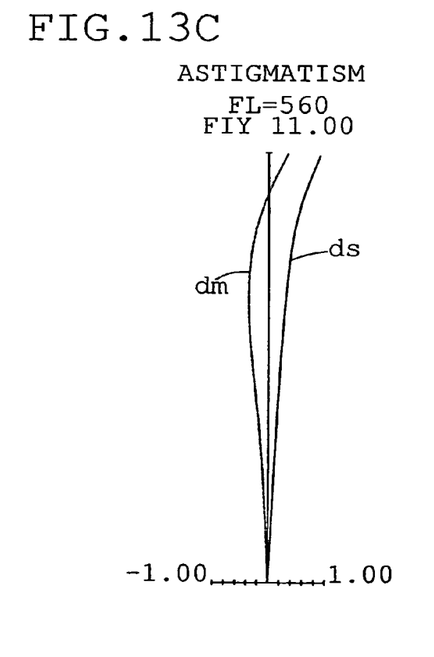
Figure 13D:
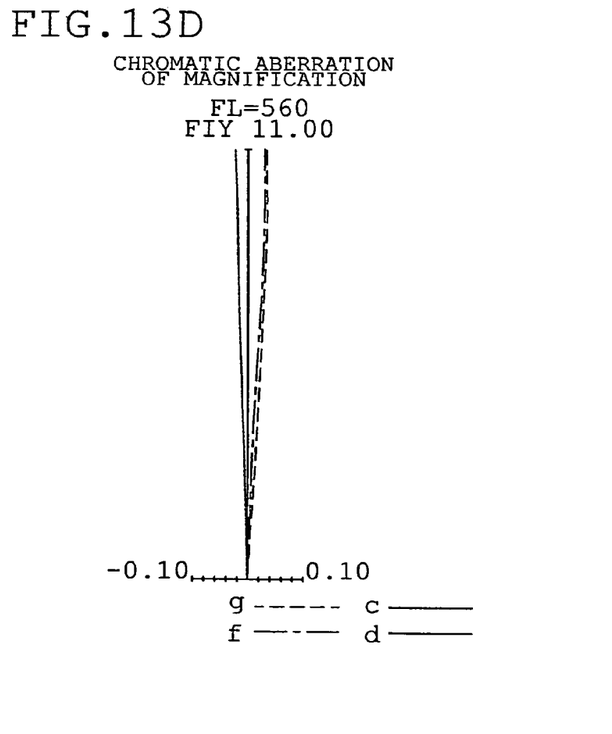

FIG. 7 is a sectional view taken along the optical axis, is of the optical system constructed of an objective lens and a second afocal variable magnification lens. An objective lens 8 shown in FIG. 7 has a large numerical aperture NA on the object side, a short focal length and a short full length.

This objective lens 8 is combined with the second afocal variable magnification lens 9.

As shown in FIG. 7, the diameter of an exit pupil of the objective lens is enlarged by the second afocal variable magnification optical system. In the fourth embodiment, as of the second afocal variable magnification optical system it is magnification M(ca)=0.5, and the diameter of the exit pupil of the objective lens is enlarged to twice.

Moreover, each of the full length of the objective lens shown in FIGS. 6A to 6D can be nearly same by keeping a suitable interval between this objective lens to the second afocal variable magnification optical system.

The objective lens shown in this embodiment, although the numerical aperture NA at the object side is large, the diameter of the lens is comparatively small.

Therefore, a problem occurs as follows: namely, when the magnification of the first variable magnification optical system is low, the luminous flux transmitted to a peripheral portion of the field of view cannot be transmitted, and accordingly only the center portion of the field of view can be observed. However, when the magnification of the first variable magnification optical system is high, such problem does not occur.

With respect to the afocal zoom lens shown in FIGS. 3A-3C, the following numerical data will be shown below. These are a radius of curvature of a surface of each optical component shown in order from an object image side, a wall thickness of each optical component, or an interval between surfaces of each optical component shown in order from the object image side (unit: mm), an index of refraction at d line of each optical component shown in order from the object side, and Abbe's number of each optical component shown in order from the object side.

Numerical data 1

| Surface number | Radius of curvature | Surface (or air) interval | Refraction index | Abbe's number |
|---|---|---|---|---|
| 1 | 143.584 | 6.5 | 1.43875 | 94.93 |
| 2 | −151.471 | 4.5 | 1.67300 | 38.15 |
| 3 | −406.964 | 0.5 | | |
| 4 | 86.266 | 7 | 1.43875 | 94.93 |
| 5 | −182.860 | 4 | 1.67300 | 38.15 |
| 6 | −627.529 | D1 | | |
| 7 | 289.274 | 5.6 | 1.73800 | 32.26 |
| 8 | −40.355 | 3 | 1.77250 | 49.60 |
| 9 | 42.167 | 3.2 | | |
| 10 | −172.814 | 2.8 | 1.77250 | 49.60 |
| 11 | 22.430 | 4.5 | 1.73800 | 32.26 |
| 12 | 267.473 | D2 | | |
| 13 | −38.998 | 2.8 | 1.67790 | 55.34 |
| 14 | −112.304 | D3 | | |
| 15 | −104.447 | 4.5 | 1.43875 | 94.93 |
| 16 | −37.846 | D4 | | |
| 17 | 86.418 | 4.5 | 1.43875 | 94.93 |
| 18 | −96.570 | D5 | | |
| 19 | −62.848 | 3.5 | 1.67790 | 55.34 |
| 20 | −174.072 | 0 | | |

A value of each intervals D1 to D5 in FIGS. 3A to 3C and numerical data of the composite focal length FL with the image forming lens shown in FIG. 4 are shown as follows:

| | FIG. 3A | FIG. 3B | FIG. 3C |
|---|---|---|---|
| D1 | 6.000 | 49.684 | 65.362 |
| D2 | 63.114 | 19.430 | 3.752 |
| D3 | 33.132 | 30.751 | 4.429 |
| D4 | 27.652 | 25.599 | 8.000 |
| D5 | 3.200 | 7.634 | 51.555 |
| FL | 56.0 | 177.0 | 560.0 |

Numerical data of the image forming lens shown in FIG. 4 are shown as follows.

Numerical data 2

| Surface number | Radius of curvature | Surface (or air) interval | Refraction index | Abbe's number |
|---|---|---|---|---|
| 1 | 69.845 | 9.98 | 1.49700 | 81.54 |
| 2 | −54.633 | 4.65 | 1.80610 | 40.92 |
| 3 | −172.571 | 9.58 | | |
| 4 | 60.898 | 11.43 | 1.83400 | 37.16 |
| 5 | −82.872 | 5.76 | 1.65412 | 39.68 |
| 6 | 31.904 | 126.94 | | |

Figure 6A:
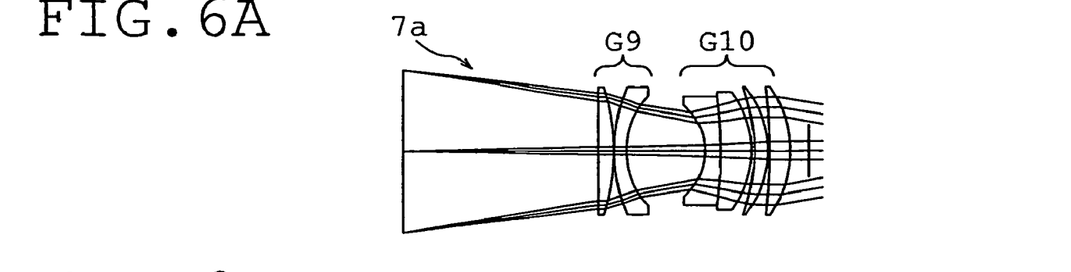
FIGS. 6A, 6B, 6C, and 6D are sectional views taken along the optical axis, of mutually different objective lenses combined with the microscope system according to the present invention, respectively.

Numerical data of the objective lens shown in FIG. 6A are shown as follows.

Numerical data 3
Focal length FL 180 mm
Full length 142.67 mm
working distance WD 71.9 mm

| Surface number | Radius of curvature | Surface (or air) interval | Refraction index | Abbe's number |
|---|---|---|---|---|
| (object surface) | | 71.927 | | |
| 1 | INF | 5.73 | 1.63980 | 34.46 |
| 2 | −84.402 | 0.66 | | |
| 3 | 67.942 | 4.2 | 1.48749 | 70.23 |
| 4 | 31.409 | 29.33 | | |
| 5 | −23.188 | 5.65 | 1.80440 | 39.59 |
| 6 | −182.839 | 11.43 | 1.49700 | 81.54 |
| 7 | −37.796 | 1 | | |
| 8 | −75.171 | 4.9 | 1.49700 | 81.54 |
| 9 | −41.164 | 0.8 | | |
| 10 | −206.366 | 7 | 1.48749 | 70.23 |
| 11 | −46.433 | | | |

Figure 6B:
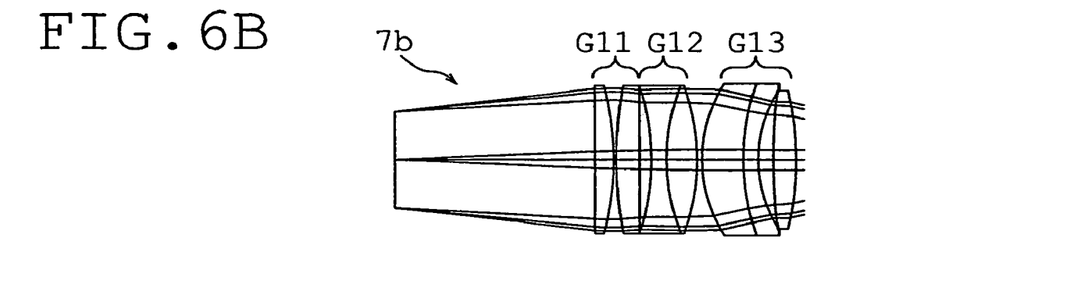

Numerical data of the objective lens shown in FIG. 6B are shown as follows.

Focal length FL 90 mm
Full length 143.86 mm
Working distance 71.6 mm

| Surface number | Radius of curvature | Surface (or air) interval | Refraction index | Abbe's number |
|---|---|---|---|---|
| (object surface) | | 71.6 | | |
| 1 | INF | 7 | 1.51633 | 64.14 |
| 2 | −104.9906 | 1 | | |
| 3 | 153.8759 | 8.5 | 1.61800 | 63.33 |
| 4 | INF | 4 | | |

-continued

Focal length FL 90 mm
Full length 143.86 mm
Working distance 71.6 mm

| Surface number | Radius of curvature | Surface (or air) interval | Refraction index | Abbe's number |
|---|---|---|---|---|
| 5 | −93.1665 | 5.52 | 1.61340 | 44.27 |
| 6 | 75.2978 | 11 | 1.43875 | 94.99 |
| 7 | −77.5003 | 1.756 | | |
| 8 | 53.2217 | 15.1 | 1.60562 | 43.70 |
| 9 | 91.3981 | 5.08 | 1.61340 | 44.27 |
| 10 | 47.5573 | 5.3 | | |
| 11 | 198.4043 | 8 | 1.43875 | 94.93 |
| 12 | −105.7296 | | | |

Figure 6C:
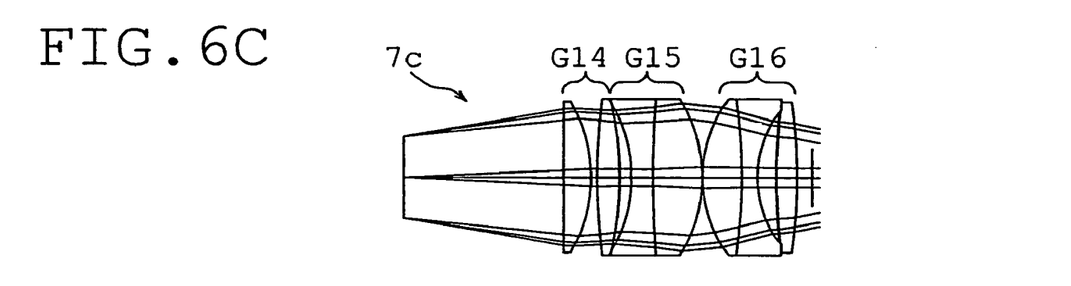

Numerical data of the objective shown in FIG. 6C are shown as follows:

Focal length FL 75 mm
Full length 137.98 mm
Working distance WD 56 mm

| Surface number | Radius of curvature | Surface (or air) interval | Refraction index | Abbe's number |
|---|---|---|---|---|
| (object surface) | | 56.01 | | |
| 1 | INF | 9.67 | 1.48749 | 70.23 |
| 2 | −55.209 | 2 | | |
| 3 | 216.606 | 8.06 | 1.43875 | 94.99 |
| 4 | −108.481 | 4.28 | | |
| 5 | −48.133 | 7.44 | 1.67300 | 38.15 |
| 6 | 377.434 | 17.3 | 1.49700 | 81.54 |
| 7 | −54.117 | 0.3 | | |
| 8 | 46.887 | 13.83 | 1.60562 | 43.70 |
| 9 | −171.744 | 5.4 | 1.61340 | 44.27 |
| 10 | 39.276 | 6.69 | | |
| 11 | 210.938 | 7 | 1.43875 | 94.99 |
| 12 | −185.942 | | | |

Figure 6D:
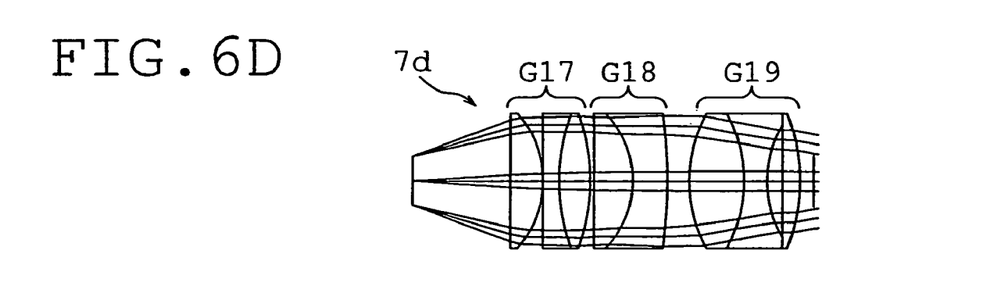

Numerical data of the objective shown in FIG. 6D are shown as follows:

Focal length FL 56 mm
Full length 140.02 mm
Working distance WD 34.9 mm

| Surface number | Radius of curvature | Surface (or air) interval | Refraction index | Abbe's number |
|---|---|---|---|---|
| (object surface) | | 34.911 | | |
| 1 | INF | 11.75 | 1.51633 | 64.15 |
| 2 | −42.021 | 0.2 | | |
| 3 | INF | 5.88 | 1.71850 | 33.52 |
| 4 | 76.173 | 11.45 | 1.49700 | 81.61 |
| 5 | −76.173 | 1.294 | | |
| 6 | INF | 14.27 | 1.49700 | 81.61 |
| 7 | −38.336 | 12.35 | 1.64450 | 40.82 |
| 8 | −220.439 | 7.913 | | |
| 9 | 57.314 | 19.91 | 1.65016 | 39.39 |
| 10 | −57.314 | 8.36 | 1.64450 | 40.82 |
| 11 | 47.362 | 5.462 | | |
| 12 | INF | 6.27 | 1.51633 | 64.15 |
| 13 | −78.2 | | | |

Numerical data of the objective lens and the afocal variable magnification lens shown in FIG. 7 are shown as follows.

Focal length FL 36 mm
Full length 141.339 mm
M(ca) 0.5
EXP(ob) 14.4→28.8

| Surface number | Radius of curvature | Surface (or air) interval | Refraction index | Abbe's number |
|---|---|---|---|---|
| (object surface) | INF | 3.788 | | |
| 1 | −6.636 | 1.63 | 1.74100 | 52.65 |
| 2 | 19.677 | 5.81 | 1.43875 | 94.97 |
| 3 | −7.977 | 0.214 | | |
| 4 | 21.662 | 3.96 | 1.43875 | 94.97 |
| 5 | −21.662 | 0.300 | | |
| 6 | 19.677 | 3.07 | 1.43875 | 94.97 |
| 7 | −32.827 | 0.571 | | |
| 8 | 12.378 | 6.25 | 1.43875 | 94.97 |
| 9 | −12.378 | 3.53 | 1.52682 | 51.13 |
| 10 | 7.977 | 5 | | |
| 11 | −6.046 | 1.79 | 1.69680 | 56.47 |
| 12 | 53.090 | 4.03 | 1.43875 | 94.97 |
| 13 | −9.458 | 0.39 | | |
| 14 | 146.241 | 3.6 | 1.56907 | 71.30 |
| 15 | −16.025 | 51 | | |
| 16 | −40.635 | 2.18 | 1.69680 | 56.47 |
| 17 | 21.438 | 5.7 | 1.78472 | 25.68 |
| 18 | 51.704 | 22.146 | | |
| 19 | 210.802 | 3.19 | 1.68893 | 31.08 |
| 20 | 51.047 | 6.84 | 1.45600 | 90.31 |
| 21 | −200.548 | 0.29 | | |
| 22 | 201.409 | 6.06 | 1.48749 | 70.21 |
| 23 | −43.1969 | | | |

What is claimed is:

1. A microscope system comprising, at least:
    an objective lens which converts a luminous flux emergent from an object into a parallel luminous flux,
    an afocal variable magnification optical system which changes a diameter of the parallel luminous flux emergent from the objective lens into a different diameter, and
    an image forming optical system for forming an image out of the parallel luminous flux emergent from the afocal variable magnification optical system,
    wherein the following conditions are satisfied:

$$2 \cdot NA(ob) \cdot FL(ob) \geq 30 \text{ (mm)}$$

$$6 \leq Lexz/X \leq 10$$

where NA(ob) is a maximum effective numerical aperture of an objective lens, FL(ob) is a focal length, in millimeters, of the objective lens, $X = 2 \cdot NA(ob) \cdot FL(ob)$, Lexz is a distance, in millimeters, from an object surface to a most distant end of the afocal variable magnification optical system.

2. The microscope system according to claim 1, wherein the microscope system is adapted to a mode in which illuminating light having a selected wavelength is projected on a sample and light emitted from the sample but having a wavelength different from the wavelength of the illuminating light is used for observation, upon further comprising a filter for separating the wavelength of the illuminating light and the wavelength of the light for observation, and
    wherein the filter is arranged within a range satisfying the following condition:

$$L(f) = F(TL)/3$$

where L(f) is a distance, in millimeters, from an exit end of the afocal variable magnification optical system to the filter, and F(TL) is a focal length, in millimeters, of the image forming lens.

3. A microscope system comprising, at least:
an objective lens which converts a luminous flux emergent from an object into a parallel luminous flux,
an afocal variable magnification optical system which changes a diameter of the parallel luminous flux emergent from the objective lens into a different diameter, and
an image forming optical system for forming an image out of the parallel luminous flux emergent from the afocal variable magnification optical system,
wherein the afocal variable magnification optical system and the image forming optical system are arranged to keep an interval L satisfying the following condition:

$$L > F(TL)/2 \text{ (mm)}$$

where L is a distance, in millimeters, from an exit end of the afocal variable magnification optical system to an entrance end of the image forming lens, and F(TL) is a focal length, in millimeters, of the image forming lens, and
wherein the following condition is also satisfied:

$$D(TL) \geq EXP(max) * 1.25 \text{ (mm)}$$

where D(TL) is an effective diameter, in millimeters, of the image forming lens, and EXP(max) is a diameter, in millimeters, of a largest exit pupil of the afocal variable magnification optical system.

4. The microscope system according to claim 3, wherein:
the microscope system is adapted to a mode in which illuminating light having a selected wavelength is projected on a sample and light emitted from the sample but having a wavelength different from the wavelength of the illuminating light is used for observation, upon further comprising a filter for separating the wavelength of the illuminating light and the wavelength of the light for observation, and
the filter is arranged within a range satisfying the following condition:

$$L(f) = F(TL)/3$$

where L(f) is a distance, in millimeters, from an exit end of the afocal variable magnification optical system to the filter, and F(TL) is a focal length, in millimeters, of the image forming lens.

5. A microscope system comprising, at least:
a plurality of objective lenses each for converting a luminous flux emergent from an object into a parallel luminous flux,
an afocal variable magnification optical system which changes a diameter of the parallel luminous flux emergent from each of the objective lenses into a different diameter, and
an image forming optical system for forming an image out of the parallel luminous flux emergent from the afocal variable magnification optical system,
wherein the plurality of objective lenses satisfy the following conditions:

$$2 \cdot NA(ob) \cdot FL(ob) \geq 30 \text{ (mm)}$$

$$X(Max)/X(Min) < 1.25$$

$$M(obH)/M(obL) \geq 2$$

$$L(obMax)/L(obMin) < 1.1$$

where NA(ob) is a maximum effective numerical aperture of each of the objective lenses, FL(ob) is a focal length, in millimeters, of each of the objective lenses, X(Max) is a maximum value of $2 \cdot NA(ob) \cdot FL(ob)$, X(Min) is a minimum value of $2 \cdot NA(ob) \cdot FL(ob)$, M(obH) is a magnification of an objective lens with a highest magnification among the plurality of objective lenses, M(obL) is a magnification of an objective lens with a lowest magnification among the plurality of objective lenses, L(ob Max) is a maximum value of distances, in millimeters, from an object surface to utmost surfaces of the objective lenses, and L(ob Min) is a minimum value of the distances, in millimeters, from the object surface to the utmost surfaces of the objective lenses.

6. The microscope system according to claim 5, wherein:
the microscope system is adapted to a mode in which illuminating light having a selected wavelength is projected on a sample and light emitted from the sample but having a wavelength different from the wavelength of the illuminating light is used for observation, upon further comprising a filter for separating the wavelength of the illuminating light and the wavelength of the light for observation, and
the filter is arranged within a range satisfying the following condition:

$$L(f) = F(TL)/3$$

where L(f) is a distance, in millimeters, from an exit end of the afocal variable magnification optical system to the filter, and F(TL) is a focal length, in millimeters, of the image forming lens.

7. A microscope system comprising, at least:
an objective lens which converts a luminous flux emergent from an object into a parallel luminous flux,
a first afocal variable magnification optical system which changes a diameter of the parallel luminous flux emergent from the objective lens into a different diameter,
an image forming optical system for forming an image out of the parallel luminous flux emergent from the first afocal variable magnification optical system, and
a second afocal variable magnification optical system configured to be insertable between the objective lens and the first afocal variable magnification optical system,
wherein the following conditions are satisfied:

$$M(ca) \geq 0.8$$

$$ENP(max) \geq EXP(ob)/M(ca)$$

where M(ca) is a magnification of the second afocal variable magnification optical system, ENP(max) is a diameter, in millimeters, of a largest exit pupil of the first afocal variable magnification optical system, and EXP(ob) is a diameter, in millimeters, of an exit pupil of the objective lens.

8. The microscope system according to claim 7, wherein:
the microscope system is adapted to a mode in which illuminating light having a selected wavelength is projected on a sample and light emitted from the sample but having a wavelength different from the wavelength of the illuminating light is used for observation, upon further comprising a filter for separating the wavelength of the illuminating light and the wavelength of the light for observation, and
the filter is arranged within a range satisfying the following condition:

$$L(f) = F(TL)/3$$

where L(f) is a distance, in millimeters, from an exit end of the first afocal variable magnification optical system to the filter, and F(TL) is a focal length, in millimeters, of the image forming lens.

* * * * *